Oct. 4, 1932.  R. H. WAPPLER  1,880,551
ENDOSCOPE
Filed Oct. 5, 1929   2 Sheets-Sheet 2
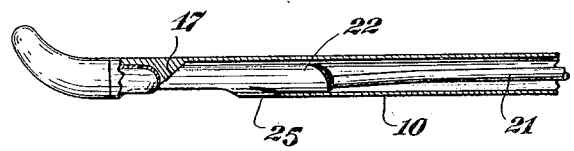
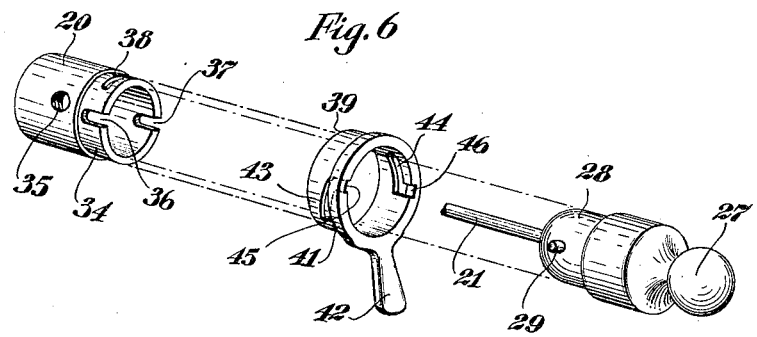
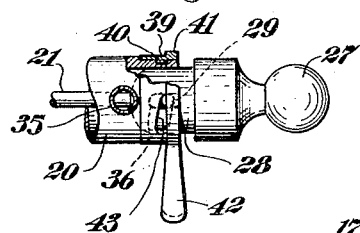
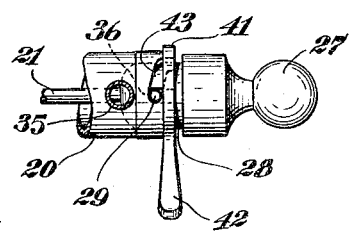
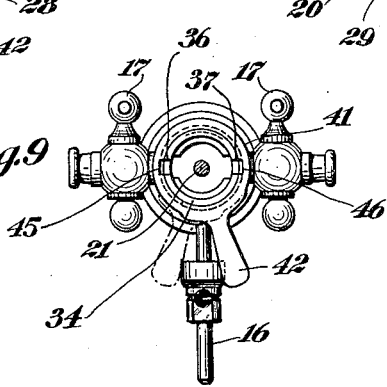
INVENTOR
Reinhold H. Wappler,
BY
Frederick Breitenfeld
ATTORNEY Patented Oct. 4, 1932

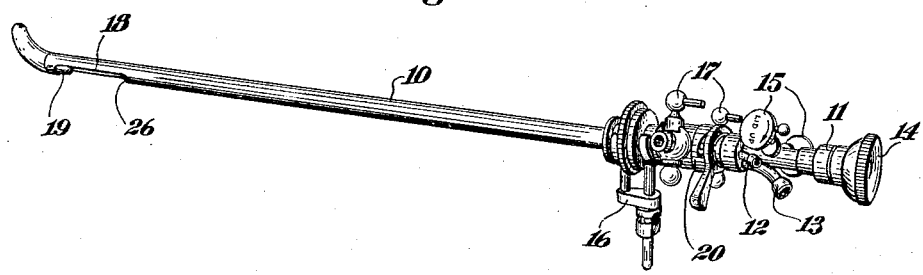
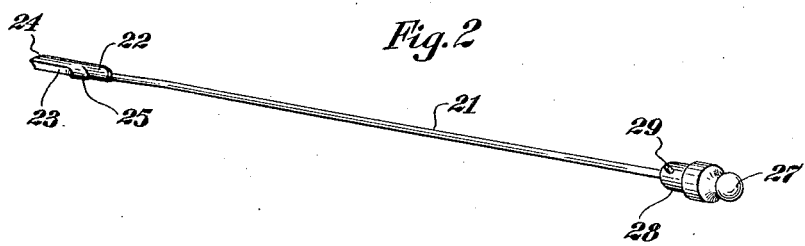
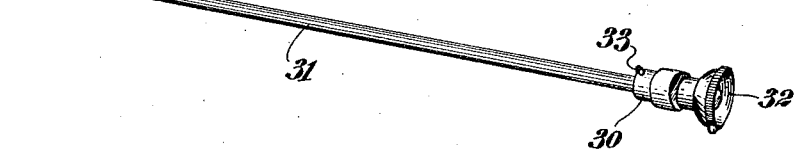
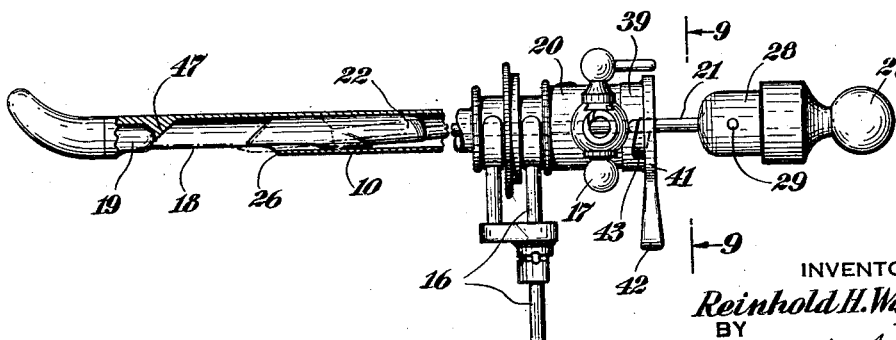

1,880,551

UNITED STATES PATENT OFFICE

REINHOLD H. WAPPLER, OF YONKERS, NEW YORK

ENDOSCOPE

Application filed October 5, 1929. Serial No. 397,496.

My present invention relates generally to diagnostic instruments, and has particular reference to endoscopes and the like.

One of the main objects of my present invention lies in the provision, in combination with an endscopic tube member and a complementary member longitudinally insertable into the former, of an improved locking means for assuring proper and firm mutual engagement of the two members.

A more particular object lies in providing a locking arrangement which is not only extremely simple from a structural standpoint, but which is also operable and controllable in the simplest possible manner by the user. Furthermore, my improved locking device serves firmly and efficiently to hold the two mutually telescoped members in proper relationship until again released.

From another aspect, it is an object of my invention to provide a fenestrated endoscopic tube with an improved type of obturator, and for providing means for not only firmly and securely locking the obturator in proper relationship, but also automatically providing for the necessary lateral adjustment of the obturator head.

One of the main features of my invention lies in the provision of a locking ring mounted for rotation coaxially with respect to the endoscope as a whole. In a preferred form, this ring is provided at the rear end of the endoscopic tube member and is provided with a radially projecting handle capable of expeditious manipulation by the finger of the operator to effect either a locking or a release of the endoscopic tube and whatever complementary member may be associated therewith.

Inasmuch as the endoscopic tube is associated from time to time with various types of complementary members, it is another feature of my invention to provide a locking arrangement of such a character that all types of complementary members may inexpensively and with great simplicity be provided with suitable means for cooperating in the contemplated manner with the endoscopic tube.

Another important feature of my invention lies in the provision of a locking device which serves not only to hold the endoscopic tube and its complementary member in firm though releasable inter-engagement, but also to draw the complementary member longitudinally and thereby assure thorough engagement thereof.

I achieve the foregoing objects, and such other objects as may hereinafter appear or be pointed out, in the manner illustratively exemplified in the accompanying drawings wherein—

Figure 1 is a perspective view of an endoscope embodying the features of my present invention;

Figure 2 is a perspective view of my improved obturator;

Figure 3 is a perspective view of a telescope, illustrative of the general type of complementary member adapted to be employed with the endoscopic tube member of Figure 1;

Figure 4 is a side view upon an enlarged scale and partly broken away of the endoscopic tube member of Figure 1 shown in preliminary association with the obturator of Figure 2;

Figure 5 is a view similar to Figure 4 showing the forward end of the endoscopic tube with the obturator in final association therewith;

Figure 6 is an exploded view of several of the elements of my improved attachment or locking portion;

Figure 7 is a view taken in the same direction as Figure 4, showing the rear end of the endoscopic tube in association with the rear end of the obturator before the latter is locked.

Figure 8 is a view similar to Figure 7, showing the obturator locked and advanced; and Figure 9 is an end view taken substantially along the line 9—9 of Figure 4.

In Figure 1, I have shown the endoscopic tube 10 associated with a complementary member designated generally by the reference numeral 11 and comprising, for illustrative purposes, a set of catheter or instrument guides. The rear end of these catheter guides may be seen at 12 and 13. This complementary member is also provided with the eyepiece 14 mounted on the rear end of a telescopic tube, and with a mechanically operated catheter deflector, the control of which depends upon the adjustment of the hand wheels 15.

I have shown the endoscopic tube 10 provided with the frictionally attached electrical binding post 16, and with the pet-cocks 17 controlling the admission of irrigating fluid, such as water.

So far as the features of my present invention are concerned, it is important to note only that the tube member 10 is provided near its forward end with a lateral fenestra 18 and with a lamp 19 mounted at the forward end of the latter; and that the rear end of the tube 10 is provided with the attaching portion 20 hereinafter more fully to be described.

In Figure 2, I have shown the obturator which is designed for use with the endoscopic tube member 10. The obturator 21 constitutes one of several complementary members adapted to be employed from time to time with the tube member 10. It is provided at its forward end with a head 22 having a main forward face 23 and a rear inclined face 24. The head 22 is designed to cooperate with the fenestra 18 for the purpose of obturating the latter. More particularly, the main surface 23 is provided with the projection 25 adapted to position itself snugly and accurately within the fenestra 18 so as to obturate and render harmless the rear curved and dangerous edge 26 of the fenestra 18.

The obturator 21 is provided at its rear end with the hand grip 27 and with the attachment collar or hub 28, the latter being provided with a pair of oppositely directed radial pins 29 whose function will be presently described.

The same type of attachment hub is shown in Figure 3 at 30 mounted upon the rear end of a telescope 31 illustrative of a second type of complementary member employed with the endoscopic tube 10. The telescope 31 has the eyepiece 32, and it is particularly to be noted that the hub 30 is provided with the oppositely disposed radial pins 33 arranged in a manner similar to that of the pins 29.

Referring for the moment to Figure 6, I will describe the attachment portion provided on the rear end of the tube 10 and constituting an important feature of my present invention. This attachment portion constitutes the main sleeve element 20 having the rearwardly extending skirt 34 of slightly reduced diameter. The opening 35 represents the opening into which one of the petcocks 17 is positioned.

The skirt 34 is provided with the two longitudinally arranged slots 36 and 37, each of these slots being open-ended toward the rear. The skirt 34 is also provided with the circumferentially arranged slot 38 whose function will be presently described.

Mounted upon the skirt 34, but shown in exploded relationship in Figure 6, is a locking ring 39. This ring is provided with an inwardly directed pin 40 shown most clearly in Figure 7 and adapted to engage within the circumferentially arranged slot 38 for the purpose of limiting the rotative movement of the ring 39 with respect to the sleeve 20, and hence with respect to the endoscopic tube 10.

At the rear, the ring 39 is provided with the portion 41 of slightly enlarged diameter, and carried by this portion is a radially projecting handle 42. The ring 39 is provided with a pair of circumferentially arranged slots 43 and 44 symmetrically positioned in diametric relationship. The main portion of each of the slots 43 and 44 extends completely through the wall of the ring 39, but each slot is provided with an entrance portion which is longitudinally arranged. Thus, the slot 43 is provided with the entrance portion 45 adapted to align and register with the slot 36 when the ring 39 is properly positioned; and the slot 44 is provided with a similar entrance portion 46 adapted to align and register with the slot 37 in a similar manner. The entrance portions 45 and 46 do not extend completely through the wall of the ring portion 41.

In accordance with one feature of my invention, the slots 43 and 44 are helically arranged. For example, the closed end of the slot 43 is further forward than the rear portion which communicates with the entrance portion 45; and the same is true of the slot 44.

In Figure 6, I have also shown the hand grip 27 of the obturator 21 along with the attachment hub 28 and one of the pins 29.

Once the sleeve 20 and the locking ring 39 are assembled (during manufacture), it is possible to rotate the ring 39 through a slight arc limited only by the inter-engagement of the pin 40 within the slot 38. When the locking ring 39 is in one extreme position, the entrance portions 45 and 46 register and align respectively with the rear ends of the slots 36 and 37. As a result, it is possible to advance the member to be inserted into the tube 10 (for example, the obturator 21) to a point illustrated most clearly in Figure 7, wherein the pins 29 have passed all the way through the entrance portions 45 and 46 respectively. At this point, a manipulation of the handle 42 from the full-line position of Figure 9 to the dot and dash position of this Figure will cause the rear walls of the slots 43 and 44 respectively to engage and advance the pins 29. When so advanced, the parts assume the relationship illustrated in Figure 8, and it is to be noted that the pins 29 are not only firmly locked against withdrawal from the slots 36 and 37, but are also in an advanced position. Compare, for example, the position of the pin 29 in Figure 7 with respect to the closed end of the slot 36, with the position of the same pin 29 in Figure 8 with respect to the same closed end.

It will thus be seen that a firm mutual inter-engagement has been effected in an extremely simple manner between the endoscopic tube member 10 and the complementary member typified by the obturator 21. The same efficient inter-engagement may be effected between the tube member 10 and any of the other members, such as the telescope 31 or the catheter and instrument-guiding member 11 of Figure 1. Furthermore, it is to be noted that a release, to permit withdrawal of the telescoped member, may be effected in an equally simple manner by simply shifting the handle 42 back to the full-line position of Figure 9.

Furthermore, the advancement of the pins 29, or the corresponding pins on the other members, assures a very firm and thorough inter-locking engagement with the endoscopic tube 10. For example, if the hubs 28, 30, etc. are slightly tapered, the advancement by means of the helical slots 43 and 44 has an effect similar to the forcing of a tapered cork into a bottle neck; and by the same token, the retraction of the pins renders the subsequent withdrawal from the endoscopic tube 10 extremely simple and uncomplicated.

An important feature of my invention lies in connection with the obturator head 22, and the operation of my improved construction depends in a large measure upon the efficient and simple advancement and retraction of the obturator 21 in the manner hereinbefore described and illustrated in Figures 7–9.

The obturator head 22 is so shaped and sized that it will fit snugly between the walls of the tube 10, as shown most clearly in full-lines in Figure 4. Furthermore, the obturator is so shaped that under normal conditions the head 22 will spring toward the closed side of the tube 10. Thus, when the obturator shown in full-lines in Figure 4 is advanced to the point where the pins 29 are positioned as in Figure 7, the head 22 will assume the dot and dash position of Figure 4. It is to be noted that the inclined rear surface 24 has encountered an inclined abutment 47 provided by me behind the lamp 19 and opposite the fenestra 18. At this point, the obturator is not yet in proper position for completely blunting and rendering harmless the rear edge 26 of the fenestra 18. The final advancement of the obturator, however, by manipulation of the handle 42 and advancement of the pins 29 causes the surface 24 to slide along the inclined abutment 47 and thereby to force the head 22 laterally into the fenestra 18, as shown most clearly in Figure 5. The lateral shifting of the head from the dot and dash position of Figure 4 to the position of Figure 5 is extremely slight, but is of extreme importance, for it is to be noted that in Figure 5 the outer surface of the projection 25 is flush with the outer surface of the tube 10, and in this way the edge 26 has been effectively blunted. The obturator head 22 is firmly held in this proper position by virtue of the firm engagement of the rear surface 24 thereof with the inclined abutment 47. When the obturator is again to be withdrawn, the manipulation of the handle 42 retracts the pins 29, thereby not only loosening the hub 28 but also permitting the head 22 to spring back into the dot and dash position of Figure 4, after which it is a simple matter merely to withdraw the entire obturator from the tube 10. By means of this construction, and the cooperative action of the inclined abutment 47 and the advancement action of the handle 42, I am enabled entirely to dispense with the necessity for providing an articulated or similarly complicated obturator head, and I am enabled to provide the obturator in the one-piece construction illustrated. At the same time, it is to be noted that the fenestra 18 is efficiently blunted in a reliable manner.

In general, it will be noted that I have provided an instrument of extreme simplicity and whose advantages will be fully appreciated by those skilled in the art. Obviously, however, changes in the details herein described and illustrated for the purpose of explaining the nature of my invention may be made by those skilled in the art without departing from the spirit and scope of the invention as expressed in the appended claims. It is therefore intended that these details be interpreted as illustrative and not in a limiting sense.

Having thus described my invention and illustrated its use, what I claim as new and desire to secure by Letters Patent is—

1. In combination with an endoscopic tube member, a complementary longitudinally insertable member, one of said members having a slotted attachment portion and the other having a pin adapted to enter said slot, and barrel-cam means carried by said slotted member for engaging and locking said pin in said slot so as to hold the members in mutually associated relationship.

2. In combination with an endoscopic tube member, a complementary longitudinally insertable member, one of said members having a slotted attachment portion and the other having a pin adapted to enter said slot, and means carried by said slotted member for releasably engaging and locking said pin in said slot so as to hold the members in mutually associated relationship, said means comprising a rotatable locking ring coaxially mounted with respect to said members and provided with a longitudinal entrance and exit slot for said pin.

3. In combination with an endoscopic tube member, a complementary longitudinally insertable member, one of said members having a slotted attachment portion and the other having a pin adapted to enter said slot, and means carried by said slotted member for releasably engaging and locking said pin in said slot so as to hold the members in mutually associated relationship, said means comprising a rotatable locking ring coaxially mounted with respect to said members and provided with a circumferentially arranged slot which crosses said first-named slot.

4. In combination with an endoscopic tube member, a complementary longitudinally insertable member, one of said members having a slotted attachment portion and the other having a pin adapted to enter said slot, and means carried by said slotted member for releasably engaging and locking said pin in said slot so as to hold the members in mutually associated relationship, said means comprising a rotatable locking ring coaxially mounted with respect to said members and provided with a circumferentially arranged slot which crosses said first-named slot; said circumferential slot having an entrance portion adapted to aline and register with said first-named slot.

5. In combination with an endoscopic tube provided with a longitudinally slotted attachment portion, a complementary longitudinally insertable member provided with a pin adapted to enter said slot, and barrel-cam means carried by said tube at said attachment portion for engaging and locking said pin in said slot so as to hold said member within said tube.

6. In combination with an endoscopic tube provided with a longitudinally slotted attachment portion, a complementary longitudinally insertable member provided with a pin adapted to enter said slot, and a rotatable barrel-cam locking ring carried by said attachment portion for engaging and locking said pin in said slot so as to hold said member within said tube, said locking ring being coaxially mounted with respect to said tube.

7. In combination with an endoscopic tube provided with an attachment portion at its rear end, said attachment portion having a longitudinal open-ended slot, a complementary longitudinally insertable member provided with a radial pin adapted to enter said slot, and a rotatable locking ring carried by said attachment portion and adapted upon rotation thereof to engage and lock said pin within said slot; said locking ring being provided with a radial handle and having a slot circumferentially arranged so as to cross said first-named slot at substantially 90 degrees.

8. In combination with an endoscopic tube member, a complementary longitudinally insertable member, one of said members having a longitudinally slotted attachment portion and the other having a pin adapted to enter said slot, and barrel-cam means carried by said slotted member for engaging and locking said pin in said slot and also advancing said pin longitudinally in said slot so as to draw and hold said members firmly into mutually locked relationship.

9. In combination with an endoscopic tube member, a complementary longitudinally insertable member, one of said members having a longitudinally slotted attachment portion and the other having a pin adapted to enter said slot, and means carried by said slotted member for engaging and locking said pin in said slot and also advancing said pin longitudinally in said slot so as to draw and hold said members firmly into mutually locked relationship; said means comprising a rotatable barrel-cam ring coaxially mounted with respect to said members.

10. In combination with an endoscopic tube member, a complementary longitudinally insertable member, one of said members having a slotted attachment portion and the other having a pin adapted to enter said slot, and means carried by said slotted member for releasably engaging and locking said pin in said slot and also advancing said pin longitudinally in said slot so as to draw and hold said members firmly into mutually locked relationship; said means comprising a rotatable barrel-cam ring coaxially mounted with respect to said members and provided with a helical slot crossing said first-named slot.

11. In combination with an endoscopic tube member, a complementary longitudinally insertable member, one of said members having a slotted attachment portion and the other having a pin adapted to enter said slot, and means carried by said slotted member for releasably engaging and locking said pin in said slot and also advancing said pin longitudinally in said slot so as to draw and hold said members firmly into mutually locked relationship; said means comprising a rotatable barrel-cam ring coaxially mounted with respect to said members and provided with a helical slot crossing said first-named slot; said helical slot having an entrance portion adapted to aline and register with said first-named slot.

12. In combination with an endoscopic tube provided with an attachment portion at its rear end, said attachment portion having a longitudinal open-ended slot, a complementary longitudinally insertable member provided with a radial pin adapted to enter said slot, and a rotatable barrel-cam ring carried by said attachment portion and adapted upon rotation thereof to engage and lock said pin within said slot and also advance the pin longitudinally in said slot.

13. In combination with an endoscopic tube provided with an attachment portion at its rear end, said attachment portion having a longitudinal open-ended slot, a complementary longitudinally insertable member provided with a radial pin adapted to enter said slot, and a rotatable barrel-cam ring carried by said attachment portion and adapted upon rotation thereof to engage and lock said pin within said slot and also advance the pin longitudinally in said slot; said barrel-cam ring being provided with a radial handle and having a helical slot which crosses said first-named slot.

14. In combination with an endoscopic tube having a lateral fenestra and a rear attachment portion, an obturator longitudinally insertable into said tube and having a head at its forward end, means carried by said attachment portion for engaging said obturator and advancing the same into said tube, and means adjacent to said fenestra to force said obturator head laterally into said fenestra as the obturator is advanced.

15. In combination with an endoscopic tube having a lateral fenestra and a rear attachment portion, an obturator longitudinally insertable into said tube and having a head at its forward end, means carried by said attachment portion for engaging said obturator and advancing the same into said tube, and means adjacent to said fenestra to force said obturator head laterally into said fenestra as the obturator is advanced; said last-named means comprising an inclined abutment in the endoscopic tube opposite said fenestra.

16. In combination with an endoscopic tube having a lateral fenestra and a rear attachment portion, an obturator longitudinally insertable into said tube and having a head at its forward end, said head having a main surface adapted to fit snugly into said fenestra and an inclined rear surface, means carried by said attachment portion for engaging said obturator and advancing it into said tube, and an inclined abutment within said tube and positioned to be encountered by said rear surface during said advance to force said main surface laterally into said fenestra.

17. In combination with an endoscopic tube having a lateral fenestra and a rear slotted attachment portion, an obturator longitudinally insertable into said tube and having a head at its forward end and a radial pin at its rear end, said pin being adapted to enter said slot, a locking ring carried by said attachment portion and adapted to engage and lock said pin within said slot and also to advance the pin longitudinally in said slot, and means in said tube for automatically forcing said head laterally into said fenestra when said pin is engaged and advanced.

18. In combination with an endoscopic tube having a lateral fenestra and a rear slotted attachment portion, an obturator longitudinally insertable into said tube and having a head at its forward end and a radial pin at its rear end, said pin being adapted to enter said slot, a locking ring carried by said attachment portion and adapted to engage and lock said pin within said slot and also to advance the pin longitudinally in said slot, and means in said tube for automatically forcing said head laterally into said fenestra when said pin is engaged and advanced; said locking ring comprising a rotatable barrel-cam coaxially mounted with respect to said tubes; and said means comprising an inclined abutment opposite said fenestra and encounterable by said head.

19. In combination with an endoscopic tube having a lateral fenestra at its forward end, an obturator longitudinally insertable into said tube and having a head at its forward end, and means carried by said endoscopic tube adjacent to said fenestra to force said obturator head laterally into said fenestra as the obturator is advanced.

In witness whereof I have signed this specification this 30 day of September, 1929.

REINHOLD H. WAPPLER.